July 13, 1926.
V. E. LIDECKER
1,592,280
LUBRICATING SYSTEM
Filed August 20, 1924
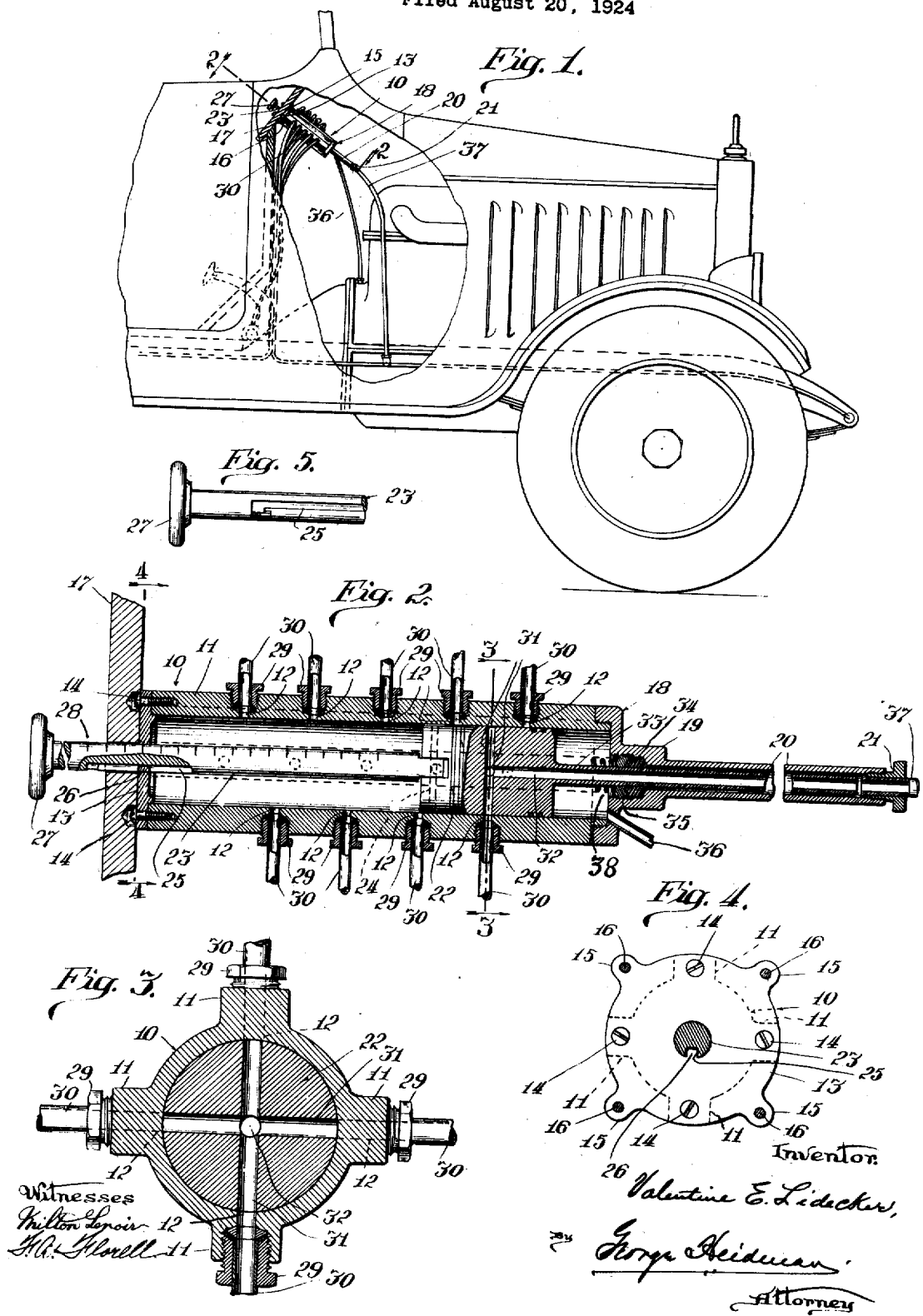

Patented July 13, 1926.

1,592,280

UNITED STATES PATENT OFFICE.

VALENTINE E. LIDECKER, OF CHICAGO, ILLINOIS.

LUBRICATING SYSTEM.

Application filed August 20, 1924. Serial No. 733,066.

My invention relates to a system whereby the various movable parts or connections of a motor driven vehicle may be lubricated from a single source of oil supply and through the operation of a single element.

My invention has for its object the provision of means whereby the various bearings and movable connections of a motor driven vehicle, namely practically all of the parts with the exception of the transmission and differential mechanism (which are usually encased in housings practically filled with oil) are lubricated from a supply required in connection with the operation of the engine; the invention contemplating means so located as to be operable from the seat of the driver, whereby all of the respective parts, or certain selected connections or parts of the motor driven vehicle may be lubricated through the operation of a single element while the automobile or truck is moving or the engine is in operation; the parts supplied with lubricant being determined or controlled by the positioning or degree of operation of said element.

The objects and advantages of my invention will be more readily comprehended from the detailed description of the accompanying drawing, wherein:—

Figure 1 is an elevation of the front portion of an automobile, with portions of the cowl and hood broken away and the dash shown in section, illustrating the application and method of installation of my improved system.

Figure 2 is a longitudinal sectional view of the operating mechanism of the system; namely the means whereby the lubricant is conveyed to the conduit or conduits leading to the parts to be lubricated; the view being taken substantially on the line 2—2 of Figure 1.

Figure 3 is a cross sectional view taken on the line 3—3 of Figure 2 looking in the direction of the arrows.

Figure 4 is an end elevation of the inner or head end of mechanism shown in Figure 2; the view being taken substantially on the line 4—4 of Figure 2.

Figure 5 is a detail bottom view of the outer end of the operating rod.

My invention relates to a system whereby the various parts of an automobile or motor driven vehicle, with the exception of the transmission, namely all of the parts which are not housed in lubricant holding casings, may be quickly lubricated while the vehicle or automobile is in motion and while the engine is in operation; the lubricant being by preference taken from the crank-case of the motor by means of a pump located in the crank-case; namely the pump which supplies oil to the motor, or by means of an oil pump, regardless of its location, which supplies the oil to the motor; that is to say, my system is intended to be used in connection with an oil supply under pressure.

The invention, as illustrated in the drawing, contemplates a suitable cylinder 10 which is preferably provided with longitudinally arranged bosses 11 at diametrically opposite points, ninety degrees apart, as more clearly shown in Figure 3; the respective bosses being each provided with the desired number of ports, as shown at 12.

The end walls of the cylinder are preferably removable; one end wall being in the nature of a disc 13 as shown in Figure 4 and adapted to fit flush against the end of the cylinder so as to provide a substantially oil tight connection therewith; the end wall or disc 13 being secured to the cylinder 10 by means of screws or bolts as at 14. This end wall or disc 13 is shown preferably provided with the radially extending lobes 15 arranged at points intermediate of the apertures which receive the screws or bolts 14, as shown in Figure 4; and these lobes 15 are intended to receive suitable bolts 16 which are of length sufficient to extend through the dash 17 of the vehicle. This method of securing the cylinder in place obviates the necessity for providing the dash with an enlarged opening and at the same time places the cylinder forward of the dash within the cowl and therefore out of the way, so as not to protrude within the vehicle and at the same time enables a comparatively short cylinder to be employed having the desired number of connections intended by the system, as the entire cylinder is exposed forward of the dash and thus permits the connections to be properly made.

The forward end of the cylinder 10 is shown provided with a removable head 18 which, by preference, is threaded onto the end of the cylinder 10 as shown in Figure 2 and is provided with the stuffing box portion or hub 19 which terminates in an elongated tubular portion 20, with the outer end theerof preferably internally threaded to receive the union or nut 21.

The cylinder 10 is provided with a piston 22 arranged in sliding relation with the inner walls of the cylinder; one end of the piston being provided with a connecting or operating rod 23 shown provided with a reduced end inserted into a suitable socket in the end of the piston and secured in place by means of a pin as at 24 in Figure 2. The connecting rod 23 is provided on the lower side thereof with a longitudinal groove or slot 25 to receive the small tongue 26 formed on the disc or head 13 and extending into the aperture in the disc through which the connecting rod extends; the connecting rod 23 being of sufficient length to also extend through an opening in the dash 17; the rod and piston being held against rotation by the tongue 26 which slides in the groove 25. The outer end of the connecting rod 23 is provided with a suitable hand grasp or button as at 27 in order to permit easy operation of the piston.

The connecting rod is also shown preferably provided with graduations on the upper side thereof, as at 28, spaced apart to correspond with the spacing intermediate of the staggered ports 12 and therefore to determine the position of the piston 22 relative to any one of the ports in the cylinder. For example, in the illustration shown in Figure 2, the third graduation is shown at the outer face of the dash 17, thus indicating that the piston 22 is positioned to establish communication with and supply lubricant to the third port in the cylinder, relative to the inner or forward end of the cylinder.

In the particular exemplification of the invention, wherein the cylinder 10 is shown provided with the port receiving bosses at diametrically opposite points, the ports 14 are arranged circumferentially in staggered relation to each other so that no two ports are in circumferential alignment with each other; as for example in Figure 3, the port 14 on the lower side of the cylinder is shown in communication with the delivery port or passageway of the piston; while the ports at the other sides of the piston and those in the top and side walls of the cylinder are out of communication or register with the port or passageway of the piston.

The cylinder, as disclosed in the drawing, is adapted to provide at least nineteen direct connections with various parts or portions of the automobile or truck to be lubricated.

The ports are shown counterbored and threaded to receive a gland nut 29 whereby a conduit or tube 30 is secured in place; each conduit or tube leading to the part of the vehicle or automobile to be lubricated; for example, the first two conduits or tubes at the right hand side in Figure 2 may lead forward to the steering knuckles of the front wheels; other tubes may lead to the elliptical springs, etc. It will be understood, of course, that if desired the tube or conduit leading from one of the ports might be provided with ramifications so that a single port will provide lubricant, for example, to both steering knuckles of the front wheels and this arrangement may also be carried out in connection with other duplicate portions or corresponding parts having similar operation and therefore requiring the same degree of lubrication.

The piston 22 is shown provided with the ports or passageways 31 arranged at right angles to each other, see Figure 3, so that one end of each passageway or port 31 may be brought to register with a port in the side wall of the cylinder; and the piston 22, extending from the intersection of the ports 31 toward the inner or forward end of the piston, is provided with a longitudinal port 32 which communicates with an elongated tubular extension or stem 33 at the forward end of the piston. This stem extends practically throughout the length of the tubular portion 20 of the cylinder head 18; the tubular extension 33 being in sliding relation with the inner wall of the tubular extension 20 and disposed through suitable packing 34 in the stuffing box 19 in the cylinder head; the packing 34 being held in place in any suitable manner, as for example by the nut or washer 35 which may screw into the portion 19 of the cylinder head. The packing thus forms a substantially fluid-tight relation with the tubular extension 33, so that oil is prevented from entering the forward end of the cylinder 10 in the event of any seepage between the tubular portion 20 and the tubular extension 33. It will be understood that no appreciable quantity is intended to be admitted in the forward end of the cylinder 10, as this would provide a cushion or "head" for the piston which will prevent proper operation. However, in the event of any slight leakage into the forward end of the cylinder, which might occur between the cylinder walls and the piston, I have shown the cylinder head 18 provided with a drain conduit 36 which may lead back to the crank-case of the motor, namely to the supply from whence the oil is taken.

The forward end of the tubular portion 20 is shown provided with a conduit 37 held in place by the union or nut 21; the conduit 37 leading to the pump on the cylinder or in the crank-case of the motor, namely connecting with the discharge end of the pump, so that oil under pressure will flow up through conduit 37 into the tubular extension 33 of piston 22, when the engine is in operation, and thereby fill the passageways 32 and 31 of the piston.

When the piston is in normal or inoperative position, namely at the extreme forward or right hand end of the cylinder as viewed in Figure 2, none of the passageways 31 will be in register with a port in the side walls of the cylinder and therefore the oil will be retained in the passageways of the piston. When the operator desires to supply lubricant to any or all of the movable parts of the truck or automobile, this may be accomplished while the vehicle is in operation by simply pulling out connecting rod 23 thereby successively moving the passageways of the piston 22 into register with the respective ports of the cylinder; permitting the passageways and ports to remain in register a brief period of time to permit sufficient lubricant (which is under pressure) to enter the respective conduits or tubes 30, through which it will be caused to flow, either due to pressure, while the passageways of the piston and the ports are in register, or through the action of gravity, as the device is preferably intended to be located on the dash of the vehicle as shown in Figure 1.

With the connecting rod provided with graduations, the operator may position the piston so as to merely lubricate the selected part of the automobile; on the other hand, if he desires to lubricate all of the parts with which the system connects, a movement of the piston from one end of the cylinder to the other will cause oil to be discharged into all of the conduits 30 leading from the different ports in the side walls of the cylinder; the discharge of oil being effected both while the piston is moved outwardly or to the left as well as during its inward movement to the right as shown in Figure 2. As is apparent from the construction shown in Figure 2, namely with the piston provided with the elongated tubular extension 33, the outer end of the tubular extension will at all times be located within the tubular portion 20 regardless of the position of the piston; the tubular extension 33 being preferably of length greater than the degree of movement of the piston in the cylinder. With this construction, a free flow of oil into the inner end of the cylinder is prevented and thus the easy operation of the piston not interfered with. The piston is formed as just described so as to also prevent an accumulation of oil in the cylinder which might find its way past the piston and toward the connecting rod end thereof where it would be apt to pass to the knob or hand grasp end and soil the hands of the operator.

The connecting rod 23, as previously described, is provided with a groove 25 to receive the lip or tongue 26, so as to prevent rotation of the piston either by the operator or through vibration where the passageways would not register with the ports; and in order to prevent accidental movement of the piston lengthwise of the cylinder through vibration, the end of the groove 25 in the connecting rod, namely the end disposed toward the hand-grasp or button 27, may be provided with a slight offset to receive the tongue 26 upon a slight twisting movement of the connecting rod.

In order to maintain the piston in its locked position, namely with the lip or tongue 26 in the off-set portion at the outer end of the groove 25, I prefer to employ a small coil spring 38 at the inner or forward end of the cylinder 10; the spring being disposed about the tubular extension 33 of the piston and bearing against the gland nut or packing holding member 35. The spring places the piston under slight pressure when the latter is in normal position, holding the tongue 26 in the off-set of the groove, while at the same time also placing the gland nut 35 under pressure and preventing any accidental rotation of the latter.

With my improved system, and especially in its application to a motor driven vehicle, it is apparent that heated or warm oil is fed to the various bearings or parts; that is to say oil automatically heated by its use on the motor is employed, which, in cold weather always insures a proper lubrication of the various parts.

I have, for purposes of exemplification, shown and described my improved system applied to an automobile, but it is apparent that the system may be readily applied to any power driven machine or element having a multiple of bearings or parts requiring repeated and proper lubrication; and while the mechanism as disclosed is believed to be a simple adaptation, certain modifications are possible and may be made without, however, departing from the spirit of my invention.

What I claim is:

1. A lubricating system of the character described, comprising, in combination with an oil supply under pressure, a cylinder provided with a plurality of ports in the side walls thereof at predetermined staggered points throughout its length, conduits leading from said ports to the various parts to be lubricated, a connection intermediate of the cylinder and said oil supply, and a ported piston slidable in said cylinder and adapted to successively effect communication between the oil supply connection of the cylinder and the respective ports in the side walls of the cylinder during reciprocation of the piston whereby delivery of oil from the supply to one conduit at a time is effected.

2. A lubricating system of the character described, comprising, in combination with an oil supply under pressure, a cylinder adapted to be secured to the dash of a motor-driven vehicle, an oil conveying connection intermediate of one end of the cylinder and the oil supply, the side walls of the cylinder being provided with a multiple of ports arranged in predetermined spaced relation, each of said ports having communication with a different part of the vehicle to be lubricated, and a piston slidable in the cylinder and operable from the seat of the vehicle, said piston being provided with a plurality of passageways therethrough, one of said passageways being arranged in communication with the connection at the end of the cylinder, while the other passageways are arranged transversely of the piston and adapted to be successively brought into communication with a correlated port in the side walls of the cylinder and flow of oil from the supply through a selected port in the cylinder permitted.

3. A lubricating system of the character described, comprising, in combination with an oil supply under pressure, a cylinder adapted to be secured to the dash of a motor driven vehicle, a connection intermediate of one end of the cylinder and the oil supply, the side walls of the cylinder being provided with a multitude of ports arranged in staggered relation, each of said ports having communication with a different part of the vehicle to be lubricated, a piston slidable in the cylinder and provided with a tubular extension slidable in said connection, said piston being provided with a plurality of intersecting passageways, one of said passageways leading through the tubular extension and arranged in communication with the connection at the end of the cylinder while the other passageways are arranged transversely of the piston and adapted to be successively brought into communication with the staggered ports in the side walls of the cylinder, and means whereby the piston may be reciprocated and its position relative to said ports determined.

4. A lubricating system of the character described, comprising, in combination with an oil supply under pressure, a cylinder adapted to be secured to the dash of a motor driven vehicle, one end of the cylinder being provided with an elongated extension adapted to be arranged in communication with the oil supply, the side walls of the cylinder being provided with ports arranged in staggered relation, connections between the ports and the various parts of the vehicle to be lubricated, a piston slidable in the cylinder and provided with a plurality of intersecting passageways, one of said passageways terminating in a tubular extension at the end of the piston, said tubular extension being slidable in the elongated extension and having oil tight relation therewith, the other passageways of the piston being adapted to be successively brought into register with the respective ports in the cylinder, and means operable at the dash of the vehicle whereby the piston may be reciprocated and its position, relative to the various ports determined.

5. A lubricating system of the character described, comprising a cylinder provided with removable end walls, one end wall being provided with a tubular extension and stuffing box, said extension being adapted to communicate with an oil supply, a drain connection intermediate of the cylinder and the oil supply, the side walls of the cylinder being provided with a plurality of ports arranged circumferentially in staggered relation, connections intermediate of each of the ports and a part of the vehicle to be lubricated, a piston reciprocable in the cylinder and provided with passageways terminating at one end of the piston while the other ends open in the side of the piston whereby oil entering at the end of the piston may be admitted to the selective port in the side of the cylinder, an operating rod connected with the piston and operable from the dash of the vehicle, and means whereby the path of the piston and its location relative to the respective ports is determined.

6. A lubricating system, comprising, in combination with the oil pump of a motor, a multi-ported cylinder, the ports being arranged circumferentially in staggered relation, with each port having connection with a different part to be lubricated, a ported piston, reciprocable in the cylinder and adapted to receive the oil from the pump, whereby the oil is successively discharged through the ports of the cylinder when the ports of the piston are brought into register with the ports of the cylinder, a graduated rod connected with the piston for reciprocating the latter and extending through a closed end of the cylinder, and means whereby the piston is normally held under pressure and the said first mentioned means with the piston locked in inoperative position.

7. A lubricating system, comprising, in combination with the oil pump of a motor, a multi-ported cylinder, the parts being arranged circumferentially throughout the length of the cylinder and each connected with a part to be lubricated, the cylinder being provided at one end with a reduced tubular extension connected with the oil supply, a ported piston reciprocable in the cylinder and having a tubular extension slidable in the cylinder extension in oil tight relation therewith, the piston extension communicating with the ports in the piston, means secured to the other end of the piston and disposed through one end of the cylinder whereby the piston is reciprocated and its position in the cylinder determined, resilient means for holding the piston under pressure when the latter is in normal non-delivering position, and means for locking the piston in said position.

VALENTINE E. LIDECKER.

cylinder and having a tubular extension slidable in the cylinder extension in oil tight relation therewith, the piston extension communicating with the ports in the piston, means secured to the other end of the piston and disposed through one end of the cylinder whereby the piston is reciprocated and its position in the cylinder determined, resilient means for holding the piston under pressure when the latter is in normal non-delivering position, and means for locking the piston in said position.

VALENTINE E. LIDECKER.

Certificate of Correction.

It is hereby certified that in Letters Patent No. 1,592,280, granted July 13, 1926, upon the application of Valentine E. Lidecker, of Chicago, Illinois, for "Lubricating Systems," errors appear in the printed specification requiring correction as follows: Page 4, line 37, claim 3, for the word "multitude" read *multiple*, and line 124, claim 7, for the word "parts" read *ports;* and that the said Letters Patent should be read with these corrections therein that the same may conform to the record of the case in the Patent Office.

Signed and sealed this 7th day of September, A. D. 1926.

[SEAL.]
M. J. MOORE,
*Acting Commissioner of Patents.*

Certificate of Correction.

It is hereby certified that in Letters Patent No. 1,592,280, granted July 13, 1926, upon the application of Valentine E. Lidecker, of Chicago, Illinois, for "Lubricating Systems," errors appear in the printed specification requiring correction as follows: Page 4, line 37, claim 3, for the word "multitude" read *multiple*, and line 124, claim 7, for the word "parts" read *ports;* and that the said Letters Patent should be read with these corrections therein that the same may conform to the record of the case in the Patent Office.

Signed and sealed this 7th day of September, A. D. 1926.

[SEAL.]

M. J. MOORE,
*Acting Commissioner of Patents.*